March 7, 1961 R. S. PAUL 2,974,096
FUEL SLUG RUPTURE DETECTOR
Filed Sept. 3, 1958
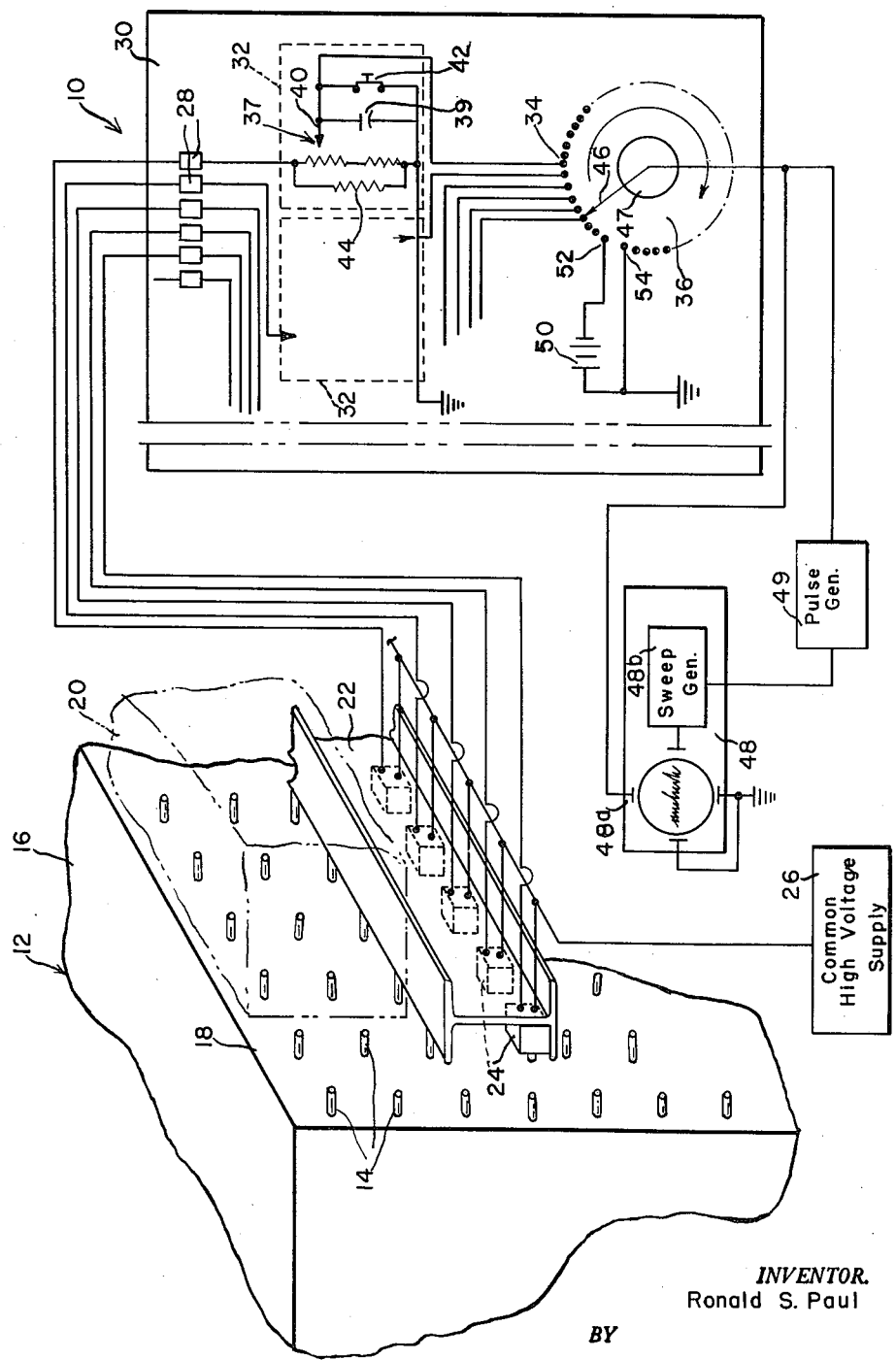
INVENTOR.
Ronald S. Paul
BY
Attorney

United States Patent Office 2,974,096
Patented Mar. 7, 1961

2,974,096

FUEL SLUG RUPTURE DETECTOR

Ronald S. Paul, Richland, Wash., assignor to the United States of America as represented by the United States Atomic Energy Commission Filed Sept. 3, 1958, Ser. No. 758,875

3 Claims. (Cl. 204—193.2)

This invention relates to apparatus for detecting malfunctions within the coolant channels of a nuclear reactor containing slugs of fuel material. More particularly this invention relates to the detection of ruptured fuel slugs and their location within the reactor. For a disclosure of nuclear reactors with which this invention may be used, reference is made to U.S. Patent No. 2,708,656, issued to Enrico Fermi and Leo Szilard on May 17, 1955.

It is an object of this invention to provide a device which may be used to identify the coolant channel which contains a ruptured fuel slug immediately after a nuclear reactor shutdown without radiation exposure to personnel.

It is another object of this invention to identify by remote control means the process tube containing a ruptured fuel slug while the reactor is in operation, thus saving time and radiation exposure in preparing for the discharge of the ruptured slug.

Other objects and advantages will become obvious on reading the following specification with reference to the attached drawing in which the single figure is a diagrammatic view in part of the apparatus in conjunction with a nuclear reactor shown in cutaway isometric.

The invention herein resides in a device comprising a plurality of radiation detectors which may be simultaneously positioned opposite the ends of coolant channels and which have an electrical voltage output responsive to the amplitude of the radiations detected thereby. The output of the detectors are connected to individual contacts of a rotatable switch so that the signal received from each detector may be imposed on an oscilloscope in a manner to enable visual detection of abnormal radiations indicating a malfunctioning fuel slug.

In the figure is shown a fuel slug rupture monitor 10 in conjunction with a nuclear reactor 12 having horizontal coolant channels 14 disposed in a solid moderator 16. The coolant channels 14 are positioned in a square lattice forming a plurality of vertical columns and horizontal rows of coolant channels. One or more slugs of fissionable material, not shown, reside within the coolant channels 14 and radiations caused by the fissioning processes are directed from the ends of the coolant channels 14 extending beyond the flat face 18 of the reactor 12.

An elevator, indicated by the dotted outline referenced 20, is positioned opposite the face 18 of the reactor and is used primarily in the loading and unloading operations of the reactor as described in the aforementioned Fermi et al. patent. An I-beam 22 attached to the bottom of the elevator 20 supports a plurality of radiation detectors 24 arranged in a horizontal row, one for each vertical column of coolant channels. Each of the radiation detectors is positioned opposite the end of its respective coolant channel 14 and is adapted to receive only the radiations emanating therefrom by means of appropriate shielding which is not shown for reasons of clarity of the drawing. Gamma ray detectors of the halogen filled Geiger tube type may be used to detect and measure the radiations emanating from the fuel slugs within the coolant channels 14 as well as other well known types of radiation detectors such as phosphor scintillation counters.

The radiation detectors 24 are all connected to a common high voltage supply 26 located either on the elevator or in a stationary location within the reactor facility in which case the connection thereto would be by means of a flexible cable. The outputs of the radiation detectors 24 are each connected to an individual junction terminal 28 on a monitor panel 30 located in the control room of the reactor facility. The connections between the radiation detectors 24 and the monitor panel 30 are also made by means of flexible cables, but could be accomplished by means of sliding contacts between the elevator 20 and its supporting structure.

The output from each radiation detector 24 is transmitted from its respective junction terminal 28 through a control network 32 to a respective stationary contact 34 on a rotatable switch 36 hereinafter described. The control network 32 comprises an integrating circuit 37 consisting of the potentiometer 38 and the capacitor 39, the D.C. signal from the radiation detector 24 being passed by the movable arm 40 of the potentiometer 38. A button switch 42 is connected between the potentiometer arm 40 and ground to selectively short out the signal from a particular detector when desired for the purpose hereinafter described. A resistor 44, connected around the potentiometer arm 40 to ground serves to reduce switching transients from the rotatable switch 36.

The switch 36 has a rotatable wiper arm 46 which is driven by a motor 47 and is adapted to sequentially engage the stationary contacts 34 as it makes its revolutions. There are at least as many stationary contacts 34 as there are detectors 24 to be monitored so that a reading may be obtained from each detector on every revolution of the wiper arm 46. A mercury jet switch is especially suitable for use as the rotatable switch 36 because of its ruggedness and because of its low switching noise output. Other types of sequence switches may be used in the practice of this invention, such as rotatable switches having magnetically operable contacts.

The signal from the wiper arm 46 of the rotatable switch 36 is transmitted to a cathode ray oscilloscope 48 where it is applied to a set of vertical deflection plates 48a which causes the electron beam therein to be vertically displaced responsive to the magnitude of the received signal. Horizontal deflection of the electron beam in the cathode ray oscilloscope 48 is provided by means of a sweep circuit 48b which is triggered through a pulse generator by means of a voltage source 50 connected to another stationary contact 52 on the rotatable switch 36. The voltage source 50 has its polarity orientated so that a voltage pulse of opposite polarity to the radiation detector output voltage pulses is placed on the wiper arm 46 as it makes contact therewith. The opposite polarity pulse operates the pulse generator 49, which triggers the sweep circuit within the cathode ray oscilloscope 48 to cause another horizontal sweep of the electron beam. It will be noted that another of the stationary contacts, referenced 54, is connected to ground. The contact 54 sequentially just precedes the contact 52 to prepare the pulse generator for the next sweep.

The electron beam makes one horizontal sweep across the face of the oscilloscope 48 for each revolution of the wiper arm 46 of the rotatable switch 36. The cathode ray oscilloscope 48 will thus show a series of pulses, each pulse representing the output from a single radiation detector 24 as the radiation detectors 24 monitor the radiation level of the coolant channels 14 in a horizontal row in the reactor 12. The elevator 20 being transportable in a vertical direction permits the monitoring of each horizontal row of coolant channels 14 extending from the face 18 of the reactor.

It will be noted that the amplitude of the output of each radiation detector 24 is recorded by the cathode ray scope and the height of the pulse on the face of the cathode ray tube is a measure of the radiation intensity from each coolant channel 14 in the horizontal row being measured. An unusually large pulse seen on the face of the cathode ray oscilloscope will indicate that the particular coolant channel contains a malfunctioning fuel slug. The particular coolant channel 14 in the horizontal row being monitored may be accurately determined by closing the contacts of the button switch 42 thereby shorting out the signal transmission of its associated radiation detector 24. The proper location of the malfunctioning fuel slug is established when the operation of one of the button switches 42 eliminates the presence of the unusually large pulse on the cathode ray scope 48. The horizontal row location is established by the known position of the elevator 20.

While a particular embodiment of the invention has been hereinbefore described there may be many modifications and substitutions which would amount to equivalents to the diagrammed apparatus. It is therefore the intention of the applicant to be bound only by the scope of the appended claims.

What is claimed is:

1. A device for detecting fuel slug ruptures in a nuclear reactor having said fuel slugs positioned in parallel channels arranged in rows and columns, each of said channels having one end extending through a flat exterior surface of said reactor, comprising: mobile means, a plurality of radiation detectors on said mobile means, each of said radiation detectors associated with one of said columns of channels, said detectors arranged to be simultaneously positioned opposite the one ends of a row of channels, said mobile means translatable in a direction parallel to said columns of channels, said radiation detectors adapted to transmit unipolarity voltage pulses responsive to the radiation detected thereby, a switch having a plurality of stationary contacts and a rotatable wiper engageable with said contacts, means for distributing the pulses from each detector to an assigned stationary contact, an oscilloscope having vertical deflection plates and horizontal sweep means, said vertical deflection plates being electrically connected to said wiper, means for rotating the wiper, and means for triggering the horizontal sweep means of the oscilloscope for each rotation of said wiper.

2. A device for detecting fuel slug ruptures in a nuclear reactor having said fuel slugs positioned in parallel channels arranged in rows and columns, each of said channels having one end extending through a flat exterior surface of said reactor, comprising: mobile means, a plurality of radiation detectors on said mobile means, each of said radiation detectors associated with one of said columns of channels, said detectors arranged to be simultaneously positioned opposite a row of channels, said mobile means translatable in a direction parallel to said columns of channels, said radiation detectors adapted to transmit unipolarity voltage pulses responsive to the radiation detected thereby, a switch having a plurality of stationary contacts and a rotatable wiper, each of said pulse detectors being connected to an associated stationary contact, means for preventing the pulses from a selected detector to be transmitted to its associated stationary contact, an oscilloscope having vertical deflection means and horizontal sweep means, the vertical deflection means of said oscilloscope connected to said wiper, means for rotating the wiper, a voltage source of opposite polarity to the received pulses connected to one of the stationary contacts not associated with one of said pulse detectors, and means responsive to said opposite polarity voltage source for triggering the horizontal sweep means of the oscilloscope.

3. A device for detecting fuel slug ruptures in a nuclear reactor having said fuel slugs positioned in horizontal parallel channels extending through said reactor, said channels arranged in square lattice of horizontal rows and vertical columns, each of said channels having one end extend through an external flat side of said reactor, comprising an elevator, a plurality of horizontally aligned gamma ray detectors on said elevator, each of said detectors positioned in line with one of the ends of a portion of the channels forming one of said rows, said elevator being translatable to simultaneously position said detectors opposite the discharge ends of any row of channels, a high voltage supply, each of said detectors being connected to said high voltage supply, a switch having stationary contacts and a rotatable wiper potentiometer means connecting each of said detectors with one of said stationary contacts on said switch, means for selectively shorting any one of said stationary contacts to ground, a voltage source of opposite polarity to said unitary voltage pulses connected to one of said stationary contacts, an oscilloscope having vertical deflection means and horizontal sweep means, said vertical deflection means connected to said rotatable wiper, said horizontal sweep means operable responsive to said rotatable wiper engaging the stationary contact connected to said opposite polarity voltage source.

References Cited in the file of this patent

UNITED STATES PATENTS

| | | |
|---|---|---|
| 1,125,699 | Leeds | Jan. 19, 1915 |
| 2,355,363 | Christadi | Aug. 8, 1954 |